United States Patent [19]

Sampson

[11] E Re. 29,922

[45] Reissued Feb. 23, 1979

[54] TRACK SELECTION CONTROL MEANS FOR MAGNETIC SIGNAL RECORDING AND REPRODUCING SYSTEMS

[76] Inventor: Sidney O. Sampson, P.O. Box 3261 Grand Central Station, New York, N.Y. 10017

[21] Appl. No.: 220,719

[22] Filed: Jan. 25, 1972

Formerly scheduled for issue and publication on Jul. 12, 1977.

Related U.S. Patent Documents

Reissue of:

[64] Patent No.: 3,315,041
Issued: Apr. 18, 1967
Appl. No.: 432,049
Filed: Jan. 22, 1965

[51] Int. Cl.[2] ..... G11B 15/12
[52] U.S. Cl. ..... 360/63
[58] Field of Search ..... 360/63, 78, 206, 61, 360/62, 66, 93, 96, 64

[56] References Cited

U.S. PATENT DOCUMENTS

| | | | |
|---|---|---|---|
| 2,335,277 | 11/1943 | Heller | 360/63 |
| 2,513,616 | 7/1950 | Begun | 360/62 |
| 2,952,746 | 9/1960 | Sampson | 360/63 |
| 3,068,326 | 12/1962 | Nowlan | 360/62 |
| 3,146,316 | 8/1964 | Knoth | 360/93 |

OTHER PUBLICATIONS

Sams Photofact Folder, Set 393, Folder 12, 3/58, Webcor Models 2812, 2816, 2822, 2892, 2896, pp. 1-16.

Hi-Fi Tape Recording, Four-Channel Head Developed, 5/58, pp. 32-33.

*Primary Examiner*—Raymond F. Cardillo, Jr.

[57] ABSTRACT

*A multiple track magnetic tape track selector stereo recorder having a head assembly including multiple recording heads and multiple associated erase heads disposed on different levels of the multiple track tape, and having a PLAY SFLECTOR control for track selection including selective switching for selectively activating and deactivating the heads connected with recording and erasing circuitry, whereby the PLAY SELECTOR control selectively activates and deactivates one recording head and one respectively associated erase head simultaneously on any one selected track from the operating stereo tracks on the tape to record and erase and rerecord signals thereby particularly controlling track selection of the multiple associated erase heads.*

2 Claims, 11 Drawing Figures

SEQUENCE A

STEREO 1,3 - 2,4

SEQUENCE E

STEREO 1,2 - 3,4

INVENTOR
SIDNEY O. SAMPSON

BY

Gordon H. Blackburn

ATTORNEY

INVENTOR.
SIDNEY O. SAMPSON
BY
ATTORNEY

TRACK SELECTION CONTROL MEANS FOR MAGNETIC SIGNAL RECORDING AND REPRODUCING SYSTEMS

Matter enclosed in heavy brackets [ ] appears in the original patent but forms no part of this reissue specification; matter printed in italics indicates the additions made by reissue.

[This application is a continuation-in-part of my copending application Ser. No. 267,881, filed Mar. 18, 1963, now abandoned.]

*This patent is entitled to the benefit of the filing date of parent application U.S. Ser. No. 797,412 entitled "FOUR TRACK MAGNETIC TAPE RECORDERS" filed on Mar. 5, 1959 and abandoned on June 14, 1962, the present patent having copended with the patent application U.S. Ser. No. 267,881 entitled "TRACK SELECTION CONTROL MEANS FOR MAGNETIC SIGNAL RECORDING AND REPRODUCING SYSTEMS" filed Mar. 18, 1963 and abandoned Feb. 20, 1965, the U.S. Ser. No. 267,881 having copended with each of patent applications U.S. Ser. No. 152,359 filed Nov. 14, 1961 entitled "COMPLETE TECHNOLOGICAL MODERNIZATION OF EDUCATION" abandoned Feb. 10, 1964 and U.S. Ser. No. 173,020 filed Feb. 13, 1962 entitled "CENTRAL CONTROL CONSOLE MEANS FOR TAPE RECORDERS" abandoned Feb. 17, 1964, the U.S. Ser. No. 173,020 having also copended with the U.S. Ser. No. 152,359, the U.S. Ser. No. 152,359 having copended with the U.S. Ser. No. 797,412, the present invention having been included in the disclosure of each of the preceding above-noted patent applications.*

*BACKGROUND OF THE INVENTION*

*This invention relates to a new improved PLAY SELECTOR control stereo tracks magnetic tape stereo recorder which solves the prior art inability to select one or the other of the stereo tracks when the stereo recorder is in record mode of operation. More particularly, the problem solved by the PLAY SELECTOR invention over prior art stereo recorders was that in the prior art each of the stereo recording heads is connected in circuitry with respective stereo recording amplifiers while the associated stereo erase heads are only connected in circuitry with a single erase oscillator circuit, thus no track selection due to the single erase circuit. Compare with: no track selection control of the dual erase heads shown disposed on two-way "dual tracks" via "switch 140" in FIG. 17 of the single-amplifier Dale patent 2,864,894 (1958); no track selection control of the dual erase heads shown disposed on two-way "dual tracks" via "switch 80" in FIG. 8 of my own single-amplifier patent 2,952,746 (1960); no track selection control of the sole erase head shown disposed across the respective stereo tracks in FIGS. 1, 2, and 3 of Nowlan patent 3,068,326 (1962); and no, track selection control of the sole erase head (not shown) disposed across both stereo tracks when the "grounded" playback "shorting switch 130" is operated in recording mode in FIG. 7 of Knoth patent 3,146,316 (1964).*

The present invention was first disclosed in my application entitled Four Track Magnetic Tape Recorders, Ser. No. 797,412, filed Mar. 5, 1959, now abandoned.

Copending applications related to this application are:

Bulk Tape Recording System, Ser. No. 830,356, filed July 29, 1959, now abandoned;

Means for Automatically Perforating and/or for Cutting Magnetic Tapes, Ser. No. 173,013, filed Feb. 13, 1962, now abandoned;

Central Control Console Means for Tape Recorders, Ser. No. 173,020, filed Feb. 13, 1962, now abandoned;

Stereo Tape Control Apparatus for a Slide Projector, Ser. No. 380,976, filed June 24, 1964, now Pat. No. 3,233,512 and its divisional application Ser. No. 418,087, filed Dec. 14, 1964 entitled Complete Technological Modernization of Education, now abandoned.

This invention relates to the art of magnetic tape recording devices and particularly concerns an improved magnetic tape recorder especially adapted for recording and reproducing sound on four tracks of a magnetic tape.

According to the invention there is provided a magnetic head assembly having four recording heads, each disposed to record and reproduce audio signals, on and from one channel of a four channel type. Associated with each magnetic head is a pair of erasing heads energized by a high frequency oscillator for erasing the signals recorded on any track just prior to re-recording signals thereon. A control circuit is associated with the various heads so that the system will record or pick up and reproduce signals from any one selected track, from any two tracks simultaneously, from a sequence of two pairs of tracks, and from any two or more tracks in any desired sequence. The system is provided with track, stereo, and sequence selector controls to effect the desired selection of recording and erasing head operations. The system also includes means to operate the apparatus continuously recording or reproducing signals on any selected sequence of tracks. The system further provides means for stopping operation automatically at the end of recording or reproducing signals from any track in any sequence of play.

The magnetic tape employed in the present system may be provided with metalized or electrically conductive leaders or trailers on opposite ends for coaction with sensing means and a solenoid operated switch serving as a motor controlling device. The solenoid is connected in a switching system and arranged for either manual or automatic control to effect the desired sequence of play of the various tracks. The sensing means makes possible automatic starting and reversing of the motor driven means for the tape. The solenoid switch further controls a step switch or counter for monitoring the number of tracks played in any predetermined sequence and stopping the recording or reproducing at the end of any such sequence or at an intermediate point therein, to resume operation again at that point if the operator so desires.

It is therefore a principal object of the invention to provide a magnetic tape recording and reproducing device employing four active recording tracks on the tape.

It is another object to provide a magnetic tape recording device having four or more recording tracks on the tape, and having control means for recording or reproducing signals from the tracks in any desired sequence.

It is still another object to provide a tape recording device which is selectively subject to manual, semi-automatic, or fully automatic control to record or reproduce signals from a plurality of tracks exceeding two in number, in any selected sequence of play.

It is a still further object to provide a multitrack tape recorder with counting means for monitoring a predetermined sequence of plays and for stopping the recorder when the sequence of plays is completed.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
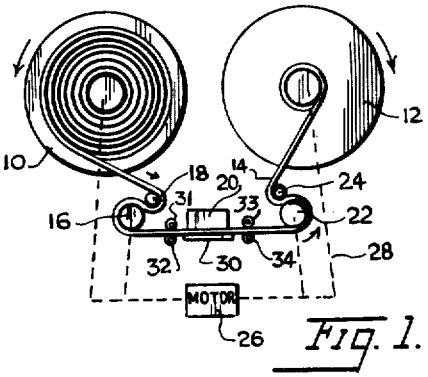
FIG. 1 is a top plan view of a tape and reel assembly which may be employed in the device.

Referring first to FIG. 1, there is shown a pair of reels 10, 12. Reel 10 is serving as the supply reel and reel 12 is serving as the take-up reel for the tape 14. The tape is threaded between a capstan 16 and tension roller 18 on one side of head assembly 20 and another pair of tension rollers 22 and 24, of which roller 22 may be another capstan which is active to drive the tape when capstan 16 is idle and vice versa. The reels and capstans are driven by a motor 26 shown in block form. The drive connection 28 between the reels, capstans and motor is conventional and is thus shown only schematically by dotted lines in the drawing. Pressure pad 30 presses the tape against the head assembly 20. Two sensing rollers 32, 34 are provided at opposite sides of the head assembly. These rollers coact with idler rollers 31 and 33, respectively, for freely passing the tape between them.

Figure 3:
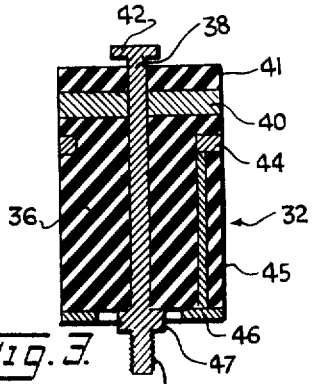
FIG. 3 is a longitudinal sectional view of a sensing element employed in the device.
Figure 2:
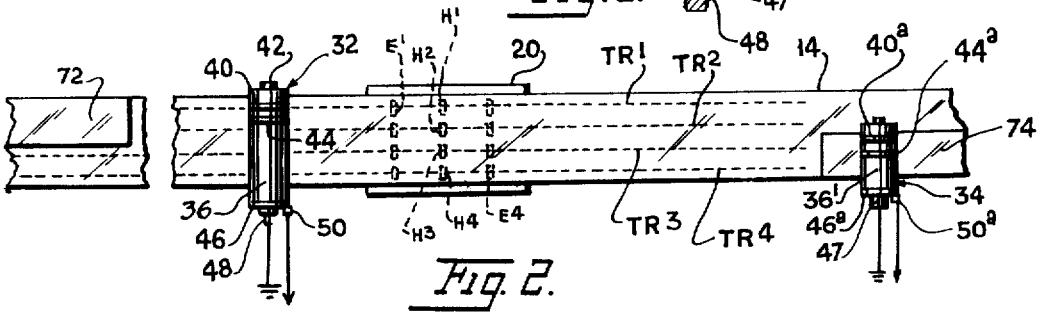
FIG. 2 is an elevational view, partially schematic, of a portion of a multitrack tape and multiple head assembly in operation according to the invention.

Rollers 32 and 34, as best shown in FIGS. 2 and 3, each includes a cylindrical resilient rubber body 36 or 36'. A metal post 38 passes through body 36 or 36'. At one end of the body is mounted a metal disk 40 or 40$^a$ which extends out radially flush with the outer surface of body 36 or 36'. A rubber disk 41 may be secured to the top of disk 40 or 40$^a$ under head 42 of the post.

Embedded in each of bodies 36 and 36' is a metal ring 44 or 44$^a$ which is spaced from disks 40 and 40$^a$. This metal ring is connected via a wire or metal electrical conductor 45 to another ring 46 or 46$^a$ secured to the bottom of body 35 or 36'. Post 38 has a flange 47 and a threaded end 48 for mounting on the chassis frame of a tape recorder and to provide a ground connection to disk 40 or 40$^a$. Rings 46, 46$^a$ are adapted to be contacted during rotation of the rollers by stationary contact elements 50 or 50$^a$ connected in the circuit of the device which will be described in connection with FIG. 11. Body 36' of roller 34 is smaller than the body 36 of roller 32 but the rollers are otherwise of identical construction. The open circuited disk 40 or 40$^a$ and ring 44 or 44$^a$ of each sensing roller are so spaced that they can be electrically connected when a metal leader or trailer element 72 and 74 carried on opposite ends of the tape 14 contacts them. The metal leaders or trailers are metal films carried preferably on the back of the tape. Roller 32 is disposed transversely to the direction of motion of the tape and its disk and ring 40, 44 are so located that only the trailer or leader 72 in the upper part of the tape will contact this disk and ring. Roller 34 has its disk and ring 40$^a$, 44$^a$ so located that only the trailer or leader 74 in the lower part of the tape will contact them. It is preferred that the metal strips or films be located on the trailing ends of the respective channels when used with the device shown in FIG. 11.

Figure 4:
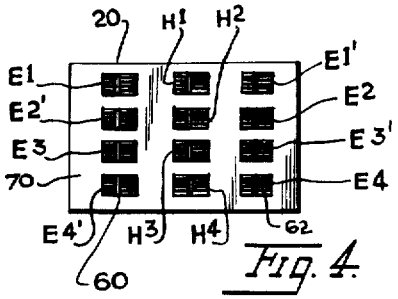
FIG. 4 is an elevational view of a multiple head assembly employed in the invention.
Figure 5:
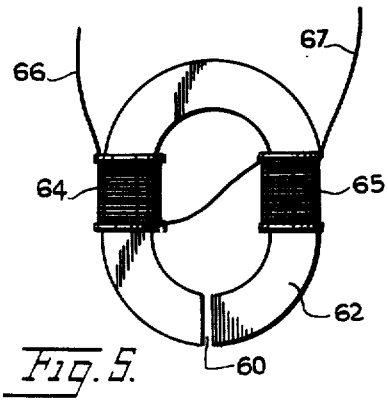
FIG. 5 is a plan view of one of the magnetic heads of the multiple head assembly.
Figure 6:
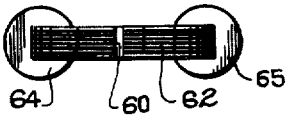
FIG. 6 is an elevational view of the magnetic head of FIG. 5.

Head assembly 20, as best shown in FIG. 4, includes four heads H1–H4 spaced transversely across the assembly. The heads are shown as stacked vertically in line with each other. Each head presents an air gap 60 to the tape as best shown in FIGS. 4, 5 and 6. The air gap 60 is formed by a split in a pile of flat annular rings or plates 62. The piled rings are each encircled with interconnected coils 64, 65 and are magnetized by electric current applied via conductor terminals 66, 67. A pair of erasing heads are provided on each side of each recording/reproducing magnetic head. The erasing head pairs E1, E1'–E2, E2'–E3, E3'–E4, E4' flank heads H1, H2, H3, H4, respectively. The groups of heads in each assembly are embedded in a block 70 made of plastic or other dielectric, nonmagnetic material. If desired, the heads H1–H4 and the erasing heads could be disposed in staggered array with an erasing head disposed under and/or over each recording/reproducing head.

Figure 11:
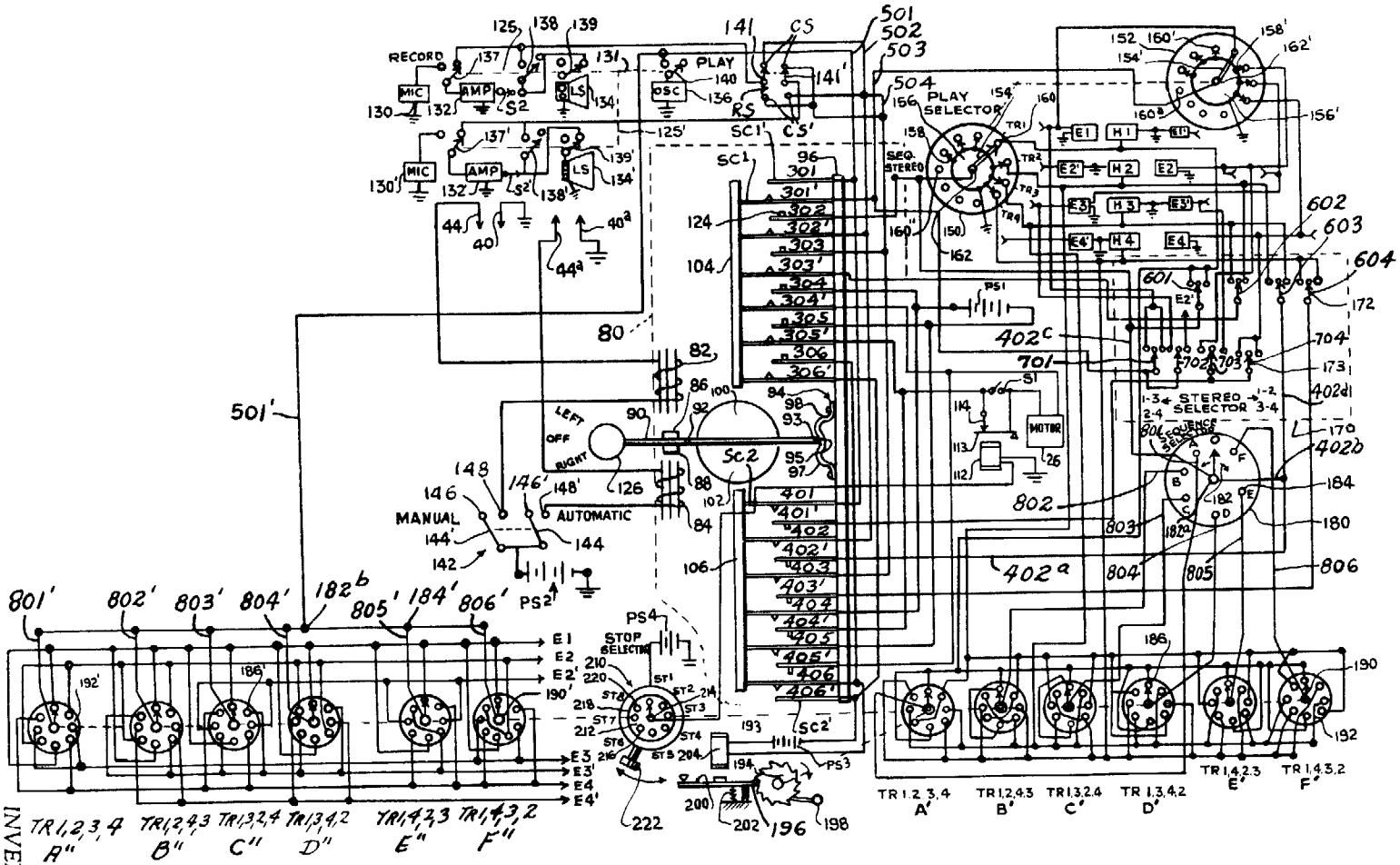
FIG. 11 is a schematic diagram of an electrical circuit which may be employed in the system.

In the schematic arrangement of the device shown in FIG. 11, there is provided a two-section, solenoid relay switch 80. This solenoid has two electromagnet coils 82, 84 disposed in axial alignment. The coils are arranged to attract alternately armatures 86 and 88 carried on opposite sides of a dielectric bar 90. The bar pivots on a stationary pin 92. The inner end 93 of the shaft is disposed to engage in the central recess 95 in the double bowed spring 94 mounted on an insulator plate 96. When armature 86 is attracted by coil 82, the shaft end 93 detents out of the recess in spring 94 to a downward position at bow 97. Attraction of armature 88 by coil 84 pivots bar 90 and detents shaft end 93 past the central recess to an upper position above bow 98.

Bar 90 carries upper and lower projecting leaves 100 and 102 positioned to push switch bars 104, 106 respectively, upward and downward. Bar 104 is spaced from plate 96 by spring contact elements SC1. Bar 106 is spaced from plate 96 by spring contact elements SC2. Plate 96 carries spring contact elements SC1', SC2' each spaced from one of spring contact elements SC1, SC2. Rectangular insulator spacer elements 124 separate the several pairs of spring contact elements. A knob 126 is provided at the outer free end of bar 90 for manual actuation of the switch contacts independently of the coils of the solenoid.

Motor 26 is connected to terminals of power supply PS1 and switch elements in the upper groups of contacts SC1, SC1' when the solenoid bar 90 is turned to the lower or RIGHT position. The connections of the motor to power supply PS1 are reversed when the solenoid bar is turned to the upper or LEFT position so that switch elements in the lower groups of contacts are connected to the respective power supply terminals.

The device is provided with a pair of stereo microphones 130, 130', stereo amplifiers 132, 132', and stereo loud-speakers 134, 134'. An oscillator 136 for driving the erasing heads E1–E4 and E1'–E4' is connected to contacts in the upper and lower groups of contacts in the switch 80 via switch 140. A RECORD-PLAY switch 131 is provided for manual actuation in setting the device for recording or playing operations. Switch 140 and switch 125 are ganged with switch 125'. The switches have ganged arms or poles 137-140 and 137'-139'. Each pole has two contact positions so that it acts as a single pole double throw switch. The poles are shown in the PLAY position in FIG. 11 and can be thrown to the left into RECORD position. Switches S2 and S2' are in circuit with the amplifiers 132, 132' for connecting or disconnecting them.

A MANUAL-AUTOMATIC selector switch 142 is provided for the device. This switch has contact points 146, 146' and 148, 148'. Double interconnected arms 144, 144' are settable to one position or the other to connect or disconnect power supply PS2 to or from coils 82, 84 of the switch 80.

Relay 112 has normally closed contacts 113, 114 in series with motor 26 which has circuit reversing contacts in the upper and lower sections of the switch 80. In operation of the device, the solenoid bar 90 may be placed manually in the OFF or center position which will open all contact elements in switch 80 to break the power supply circuit of motor 26. When switch 142 is set on AUTOMATIC, sensing roller contacts 44 and 44$^a$ are connected in series with coils 82, 84 which are energized by power supply PS2 when either of the metal conductors 72 or 74 of tape 14 close the circuits between contacts 40 and 44, or 40$^a$, 44$^a$. Motor 26 will be driven and reversed continuously, first driving the tape 1 in one direction then automatically reversing and driving the tape in the opposite direction each time contacts 40, 40$^a$ and 44, 44$^a$ are closed by a metal conductor 72 or 74. A switch S1 is connected across contacts 113, 114 to disable relay 112. When the switch S1 is closed and switch 142 is set at MANUAL position, reversing control of motor 26 is effected by manually setting solenoid bar 90 in LEFT or RIGHT positions. The system thus provides manual or automatic control of reversing and direction of drive of the motor 26.

When the bar 90 is thrown in either the RIGHT or LEFT position and the RECORD-PLAY switch is thrown in either the RECORD or the PLAY position, the poles 141, 141' of reversing switch RS then connect the amplifiers 132, 132' to apply unique alternative switching operations of the amplifiers 132, 132' especially throughout the RECORD/PLAY operations of the recorder's individual systems of the PLAY SELECTOR control means and the SEQUENCE SELECTOR control means. It can be applied to the STEREO SELECTOR.

Switch RS is a reversing switch. It has two ganged poles 141 and 141' which can respectively make contact with upper contacts CS or with lower contacts CS'. When the poles are in the upper position as shown in the drawing, amplifier 132 is connected via pole 141 to contact 302"and to contact 402, while amplifier 132' is connected via pole 141' to contact 303 and 403. When the switch is reversed to set the poles 141, 141' in the lower position at contacts CS', the amplifiers 132, 132' are then connected to contacts 303, 403 and 302', 402 respectively.

Switch RS is an independent manually operated switch; and it is not ganged to the PLAY-RECORD switch.

Switch RS enables either one of the amplifiers 132, 132' to be operationally connected via arm 154 of the PLAY SELECTOR for use as the track selector amplifier, by reversing poles 141, 141' of reversing switch RS from contacts CS to CS'. Poles 141, 141' can be operated between the upper and lower contact points CS, CS' when the PLAY-RECORD switch is thrown in the RECORD position thus alternately connecting either amplifier 132 or 132' to the PLAY SELECTOR and/or the SEQUENCE SELECTOR for diverse signal recording on any of the tracks.

The reversing switch RS with its reversing poles 141, 141' could be omitted but it increases the versatility of the system and should be left in the circuit.

The circuit of FIG. 11, is shown in PLAY operation, and bar 90 is considered as having been thrown to the RIGHT position. Lines 501, 502, 503, 504 are then connected in the circuits of amplifiers 132, 132' and oscillator 136 to contacts 301-303' of the upper operating switch section of switch 80. When bar 90 is thrown in the LEFT position, this upper switch section is then deactivated while the opposed lower switch section having the contacts 401-403' connected in circuit with lines 501, 502 and 504 thereby simultaneously connect the circuits of amplifiers 132, 132' and oscillator 136 for the next consecutive operation of the switch 80.

Suppose that bar 90 is thrown in the RIGHT position and the RECORD-PLAY switch is thrown in the RECORD position, microphone 130 and amplifier 132 are then connected in respective circuit of line 502 through the upper switch section and contacts 302' and 302 thereby energizing arm 154 of the PLAY SELECTOR, and connected at the PLAY SELECTOR to energize arm 601 of the STEREO SELECTOR which is shown disabled.

Microphone 130' and amplifier 132' are then connected in respective circuit of line 504 through contacts 303 and 303' thereby energizing arm 602 of the STEREO SELECTOR which is shown disabled.

Oscillator 136 is then simultaneously connected in respective circuit of line 501 to contacts 301 and 301' and via line 503 thereby energizing arm 154' of the PLAY SELECTOR, and connected at the PLAY SELECTOR to energize arms 701 and 702 of the STEREO SELECTOR which is shown disabled.

Suppose that bar 90 is next thrown in the LEFT position and the RECORD-PLAY switch is also thrown in the RECORD position, microphone 130 and amplifier 132 are then connected in respective circuit of line 502 through the lower switch section and contacts 402 and 402' and lines 402$^a$, 402$^d$ thereby energizing arm 603 of the STEREO SELECTOR which is shown disabled, and via lines 402$^a$, 402$^b$, 402$^c$ connected at the STEREO SELECTOR to energize arm 154 of the PLAY SELECTOR. The SEQUENCE SELECTOR is shown disabled.

Microphone 130' and amplifier 132' are then connected in respective circuit of line 504 and contacts 403 and 403' thereby energizing arm 604 of the STEREO SELECTOR which is shown disabled.

Oscillator 136 is then simultaneously connected in respective circuit of line 501 to contacts 401 and 401' thereby energizing arms 703 and 704 of the STEREO SELECTOR which is shown disabled.

Heads H1-H4 are connected to a PLAY SELECTOR switch 150, 152 having ganged rotors 162, 162' manually rotatable together. The switch has arms 154, 154' disposed to contact any one of the circumferentially disposed stationary contacts 160, 160' respectively. The switch arms are insulated from disks 156,

156' which rotate with rotor shafts 162, 162'. The disks are conductive members which are grounded and each carries radially extending six shorting contacts 158, 158'. Arms 154, 154' are disposed radially between each trio of three contacts 158, 158'. Heads H1-H4 are connected to respective contacts 160 at positions TR1, TR2, TR3 and TR4 of the switch, respectively. Erase heads E1-E4 are similarly connected to contacts 160'. When arm 154 is turned to any of the marked positions, for example TR1, then the contacts at the other switch positions marked TR2-TR4 are shorted to ground and the connected heads H2-H4 are likewise shorted to ground. A similar shorting effect is obtained at switch section 152 for the erase heads E1-E4. Therefore the contacts at the switch positions effect connecting of the recording means and erasing means and reproducing means of the respective amplifier and/or amplifiers and the oscillator to the selected heads thus to activate a selected track for recording and for erasing and for reproducing signals respectively when the connected recording means and erasing means and reproducing means are respectively actuated by switch 131. The PLAY-SELECTOR switch is thus in effect a shorting switch for enabling or disabling the various selected recording-reproducing heads and erasing heads. One contact 160" of switch section 150 marked SEQ. STEREO and a similar contact 160$^a$ of switch section 152 is a stereo sequence selector position. When arms 154, 154' are in this position all the contacts of the switch sections 150, 152 are open circuited so that the entire switch is disabled. Control of the system is then passed to the STEREO SELECTOR switch 170. This switch has a plurality of ganged switch arms 601-604 and 701-704.

When the PLAY SELECTOR is turned to the SEQ. STEREO position, the STEREO SELECTOR may be actuated preferably at the 1, 3"2, 4 switch position whereby the STEREO SELECTOR operates the same recording/reproducing heads and respectively associated erase heads that are shown operated by the PLAY SELECTOR.

A particular novelty of the PLAY SELECTOR control switch is that it simultaneously deactivates the heads respective to the plurality of track selection positions and simultaneously activates the heads at the SEQ. STEREO selection position of the switch respective to the plurality of stereo channel tracks. This novel dual switching operation for a plurality of track selection positions and the respective stereo selection position of the PLAY SELECTOR provides novel utility of head control means.

The 1 and 3 consecutive track selection positions of the PLAY SELECTOR may obviously be utilized for equivalent flip-flop conventional recorder operations by inverting the tape over the heads as is universally employed. The recorder system provides both the utility of the automatic tape reversing system and that of the manual flip-flop tape inverting system. Please note that the respective heads at successive track position 2 are simultaneously deactivated whenever, the respectively selected heads at consecutive track positions 1 and 3 are alternately activated.

The upper switch arms 172 of the STEREO SELECTOR control the connections to the various heads H1-H4 in two groups, either H1, H3-H2, H4 or H1, H2-H3, H4 having respectively associated erase heads E1, E3-E2, E4 and E1, E2'-E3', E4. The lower arms 173 control the connections to the aforenamed associated erase heads. The switch arms are disponsable in right, left or OFF positions. The OFF position is the center position. In the left or 1, 3-2, 4 stereo position, the system is arranged to operate in stereo to record or reproduce, depending on the position of the RECORD-PLAY switch 131, for recording or reproducing on tracks TR1, TR3 simultaneously with the tape moving to the right from reel 10 to reel 12, and on tracks TR2, TR4 simultaneously with the tape moving to the left. In the right or 1, 2-3, 4 position the system operates in stereo with recording or reproducing on tracks TR1, TR2 simultaneously while the tape moves right, and on tracks TR3, TR4 simultaneously while the tape moves left. By system operation in stereo is meant that one head of a simultaneously active pair is connected to one of the stereo amplifiers 132, 132' and the other active head is connected to the other amplifier.

Suppose that the STEREO SELECTOR is activated at the 1, 3-2, 4 position, switch 142 is on MANUAL, bar 90 is in LEFT position for tape travel right to left, switch 131 is set at RECORD, therefore recording heads H2, H4 and erase heads E2, E4 at tracks 2 and 4 are being respectively activated by arms 603, 604 and 703, 704. If the PLAY SELECTOR is now operated to select, for example, the track 2 position, then the STEREO SELECTOR is automatically disabled. The PLAY SELECTOR is in control of heads H1-H4, E1-E4, microphones 130, 130', amplifiers 132, 132' and oscillator 136; arms 154 and 154' being at track 2 position enables heads H2 and E2 to remain active while heads H1, H3, H4 and associated erase heads E1, E3, E4 are simultaneously disabled due to being shorted to ground via the selective, automatic shorting action of the trio of three contacts 158, 158'. Without this novel selective shorting action, heads H4 and E4 would remain activated by STEREO SELECTOR arms 604, 704. If the PLAY SELECTOR is operated to the track 4 position, then arms 154, 154' enables heads H4 and E4 to remain active while heads H1, H2, H3 and E1, E2, E3 are similarly shorted to ground. Therefore, the novel PLAY SELECTOR control efficiently, selectively activates and deactivates the heads at the track selection positions, and at the stereo tracks selection position while it controls the invention's recording, erasing, and reproducing operations in a simplified and coordinated way over the great many complex controls required to be operated by prior art combination single track/stereo tracks recorders.

Figure 7:
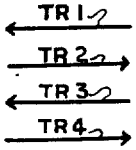
FIGS. 7 through 10 are of several sequences of track play of which the system is capable.

When switch 170 is in the center or OFF position, this switch is disabled and control of the system is passed to the SEQUENCE SELECTOR switch 180. This switch has a manually rotatable arm 182 settable to any one of six switch positions A-F which permits the system to operate in any one of six predetermined sequences of track operation via the respective operating arms of rotors 190, 190' shown in ganged arrangement on shaft 193 activating the respective operating recording head and respectively associated erase head indicated at track positions A'-F', A"-F". For example, in sequence A, recording or reproducing will take place at tracks TR1, TR2, TR3 and TR4 in the order stated. This sequence is illustrated in FIG. 7. The arrowhead indicate the direction in which recording or picking up of signals takes place at the specified track of the tape 14. The tape is, of course, being driven in the opposite direction.

Suppose that bar 90 is thrown in the RIGHT position and the RECORD-PLAY switch is thrown in the RE- CORD position, microphone 130 and amplifier 132 are then connected in respective circuit of line 502 through the upper switch section and contacts 302' and 302 and via line 402$^c$ to circuit connection 182$^a$ and respective contact 184 thereby energizing the respective operating arm of the rotors 190 indicated at A'-F'.

Oscillator 136 is then simultaneously connected in respective circuit of line 501' to circuit connection 182$^b$ and respective contact 184' thereby energizing the respective operating arm of the rotors 190' indicated at A''-F''.

Suppose that bar 90 is next thrown in the LEFT position and the RECORD-PLAY switch is also thrown in the RECORD position, microphone 130 and amplifier 132 are then connected in respective circuit of line 502 through the lower switch section and contacts 402 and 402' and via lines 402$^a$ and 402$^b$to circuit connection 182$^a$ and respective contact 184 thereby energizing the respective operating arm of the rotors 190 indicated at A'-F'.

Oscillator 136 is then simultaneously connected in respective circuit of line 501' to circuit connection 182$^b$ and respective contact 184' thereby energizing the respective operating arm of the rotors 190' indicated at A''-F''.

The recording circuit of line 502 of amplifier 132 to circuit connection 182$^a$, the associated erasing circuit of line 501' of oscillator 136 to circuit connection 182$^b$ and the individual contacts 184, 184' are coactively arranged together. Lines 801-806, 801'-806' are shown individually connected to respective individual contacts 184, 184' thereby energizing the respective operating switch arms of rotors 190, 190' at the respectively selected sequence of track operation of the six track operations shown at A'-F', A''-F''. The respective operating track sequence is active only when the SEQUENCE SELECTOR switch 180 is actuated from its disabled position to select anyone of the six predetermined sequences of tracks selection positions shown A-F, and the PLAY SELECTOR and the STEREO SELECTOR are disabled. For example, when arm 182 is operated to the sequence F, selection position of switch 180, the recording circuit of amplifier 132 is connected to circuit connection 182$^a$ and via respective contact 184 and line 805 thereby energizing the respective operating arm of the rotors 190 thus selectively activating and deactivating the recording heads being operated at the respective operating sequence of tracks indicated at E' while the associated erasing circuit of oscillator 136 is simultaneously connected to circuit connection 182$^b$ and via respective contact 184' and line 805' thereby energizing the respective operating arm of the rotors 190' thus selectively activating and deactivating the erase heads being operated at the respective operating sequence of tracks indicated at E''.

The six SEQUENCE SELECTOR switch contacts 184 are connected respectively to rotors 190 of six stationary switch disks 192. Each of these disks is an insulated member carrying eight fixed contacts 186. The conductive rotors 190 are all mounted on an insulated rotatable shaft 193 indicated by a dotted line. This shaft is driven by a ratchet wheel 194 of a step switch 196. The wheel is engaged by a spring 198 which holds the wheel in each of its step positions. The wheel is stepped angularly by a finger at the end of armature 200. This armature is biased by spring 202 away from the teeth of the wheel but is advanced to move the wheel one step clockwise when solenoid 204 is energized. This solenoid is connected to two pairs of contacts in the upper and lower sections of switch 80 so that on each reversal of switch 80 the solenoid 204 is pulsed by power supply PS3. Each time switch 80 reverses the switch 196 is advanced one step and arms of rotors 190 move one switch position clockwise. The switch 196 steps in both MANUAL and AUTOMATIC control positions of the system.

The six disks have their fixed contacts 186 connected to heads H1-H4 in the arrangement shown in order to permit the system to operate in any of six tracks sequencies A-F as follows:

| Sequence: | Tracks (TR) |
|---|---|
| A | 1,2,3,4 |
| B | 1,2,4,3 |
| C | 1,3,2,4 |
| D | 1,3,4,2 |
| E | 1,4,2,3 |
| F | 1,4,3,2 |

In every case the sequence begins with track TR1 recording or reproducing from right to left while tape travel is from left to right. A similar set of six disks 192' indicated A''-F'' is provided for connection of erase heads E1-E4' to fixed contacts 186'. These disks are associated with rotors 190' which are mounted in the same positions as rotors 190 on shaft 193. Rotors 190' are connected respectively to contacts 184'. Each time the ratchet wheel steps it acts like a counter to count off the number of reversals of travel of the tape 14 in any sequence of track plays.

The SEQUENCE SELECTOR is capable of selecting any of the designated six sequences of plays A-F. This selection is entirely arbitrary and is based on track TR1 in all sequences being played first and played right to left. If it is desired to have the system also capable of playing the tracks in the same order as sequences A-F but with play taking place in an opposite direction then the connections of erasing heads should be changed from E1-E4 to E1'-E4' and vice versa. If both sequences are desired then an additional six disks 192' must be provided on shaft 193' and a subsequent selector switch must be provided to select between operation of the first groups of six disks 192' or the added group of disks.

For a four track system, the tracks can be played in only the following twenty-four possible sequences:

| | | | |
|---|---|---|---|
| 1,2,3,4 | 2,1,3,4 | 3,1,2,4 | 4,1,2,3 |
| 1,2,4,3 | 2,1,4,3 | 3,1,4,2 | 4,1,3,2 |
| 1,3,2,4 | 2,3,1,4 | 3,2,4,1 | 4,2,1,3 |
| 1,3,4,2 | 2,3,4,1 | 3,2,1,4 | 4,2,3,1 |
| 1,4,2,3 | 2,4,3,1 | 3,4,1,2 | 4,3,2,1 |
| 1,4,3,2 | 2,4,1,3 | 3,4,2,1 | 4,3,1,2 |

These sequences always start with play on the first track starting from right to left, the tape travel being in the opposite direction. The next succeeding tracks then play left-right, right-left, finally left-right. If it is also desired that the system be arranged to be capable of starting a sequence from left to right and succeeding play as right-left, left-right, and right-left, then the system will have forty-eight possible playing sequences. To accomplish this the SEQUENCE SELECTOR switch 180 must be enlarged to provide for twenty-four switch positions. Twenty-four disks 192 and forty-eight disks 192' must be provided on shaft 193. The connections to the heads H1-H4 and E1-E4' will then be made to positions on these disks. Only twelve disks 192, 192' are shown in order to simplify the diagram but from the instructions given and the examples shown, the other disks can readily be wired into the circuit. The system will then be capable of playing the four tracks of the tape in every possible order of four tracks, each track being played only once.

The system is arranged so that when it is on AUTOMATIC or MANUAL it will play any selected sequence twice and the motor will then be stopped and cannot be started again until the STOP SELECTOR is operated. The stop selector switch 210 includes a disk 212 just like the other disks 192, 192' with a rotor 214 mounted for rotation on shaft 193 just like rotors 190, 190'.

In series with the arm of rotor 214 is the coil of relay 112. Disk 212 has stationary contacts 216 and around this disk is a manually rotatable ring 218 carrying an index contact 220. The ring is movable by a knob 222 which can set the contact 220 in any one of the eight positions of contacts 216. A power supply PS4 is in series with contact 220 and will energize relay 112 when the arm of rotor 214 comes around to contact 220 after the wheel 194 steps eight times or counts off eight successive traverses of the tracks of the tape 14.

When relay 112 is actuated it opens the circuit of motor 26 which then cannot be started again unless ring 218 is moved to another selected stop position ST1–ST8 or unless switch S1 is closed to disable the motor stop circuit. The STOP SELECTOR can thus be operated to limit the system operations respective to any selected stop position. The circuit connections of the STOP SELECTOR can be traced through contacts 304–306' and 404–406' of switch sections SC1 and SC2 respectively.

Suppose now the system is in the position shown in FIG. 11. Switch 142 is on MANUAL which means that the motor is under the control of the operator. The RECORD-PLAY switch is in PLAY position so that erase heads E1–E4' are deactivated. The PLAY SELECTOR switch is at TR1 position which permits signals to be picked up by head H1 from track TR1. Since the PLAY SELECTOR switch is active the STEREO SELECTOR and SEQUENCE SELECTOR are disabled. The motor 26 may now be manually controlled to drive the tape left to right to reproduce signals through amplifier 132 from track TR1. On the reverse travel all heads H1–H4 are disabled. Advancing the PLAY SELECTOR to any of positions TR1–TR4 effects signal reproduction from any of the selected tracks TR1–TR4. If the system were on AUTOMATIC operation, signals would be automatically played from track TR1 four times until the stop switch stepped around to position ST8 where it is set whereupon resetting would be required.

Figure 8:
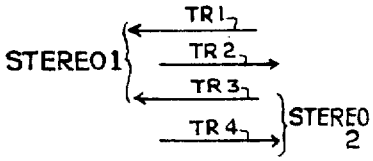
Figure 9:
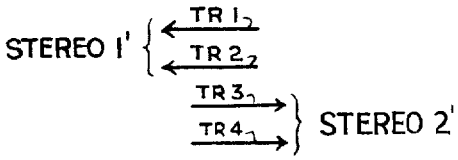

Leaving the system on MANUAL operation, suppose the PLAY SELECTOR is advanced to select SEQ.-STEREO, then the STEREO SELECTOR is activated. Suppose the STEREO SELECTOR is set to the left to sequence 1, 3–2, 4. Then signal reproduction will take place from tracks TR1, TR3 simultaneously on travel of tape 14 to the right and from tracks TR2, TR4 on travel to the left. This stereo sequence is illustrated in FIG. 8. Setting the SEREO SELECTOR to the right position will effect play of the stereo sequence 1, 2 and 3, 4 illustrated in FIG. 9, all under manual control. If the system were on AUTOMATIC then stereo play would occur automatically and continuously for eight track reversals. Setting the STOP SELECTOR to position ST1 will effect play for only one half of a stereo sequence. Setting the STOP SELECTOR to ST2 will effect play of an entire stereo sequence. The STOP SELECTOR is capable of permitting eight reversals of track 14 or four complete stereo sequence plays. If more plays are desired automatically then the STOP SELECTOR must be disabled by closing switch S1.

Figure 10:
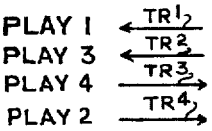

Suppose the STEREO SELECTOR is set at OFF and the PLAY SELECTOR is at SEQUENCE-STEREO, then the SEQUENCE SELECTOR is in control. If the play selector is set at sequence A position and the system is under manual control, then each time arm 90 reverses the position of travel of the tape 14 play will take place on the next track in the selected sequence. For sequence A this will be play from tracks 1, 2, 3, 4 as illustrated in FIG. 7. If the SEQUENCE SELECTOR is set at sequence E as illustrated in FIG. 10, then the first play takes place on tracks TR1, the next play is on track TR4, the third play is on track TR2 and the fourth play is on track TR3. In such a staggered track arrangement crosstalk between tracks is minimized or eliminated. If the system were on RECORD rather than on play for this sequence, erase heads E1, E4, E2' and E3' would be active while their companion heads E1', E4', E2 and E3 would be inactive. For sequence A, erase heads E1, E2, E3 and E4 would be active. Of course, if the system were on AUTOMATIC rather than on MANUAL control the selected sequence would be repeated twice if the STOP SELECTOR were on position ST8 and would be repeated continuously if the STOP SELECTOR were disabled via switch S1. Setting the STOP SELECTOR to any other position such as ST6 will permit a full sequence and then one half of a full sequence of play.

Automatic recorders heretofore known have been capable of playing one predetermined sequence of plays such as sequence A or stereo sequence, 1, 3–2, 4. The present system makes it possible to play any selected stereo or consecutive sequence. Once a sequence is selected the system is automatic in playing that sequence even though under manual control for starting, stopping and reversing the direction of tape travel. To this extent, when the SEQUENCE SELECTOR is active the system in on MANUAL control, a semi-automatic control condition exists.

If the operator should desire a sequence of plays which is not consecutive, that is, not included in the forty-eight sequences of which the system is capable as described above, then the manually operably PLAY SELECTOR employed to set arms 154, 154' to the various track positions in any desired order in turn whatever; and the system will be operated in the selected sequence. In general, however, the forty-eight possible sequences which are inherent in the system will accommodate practically all sequence requirements, and the operator will resort to the PLAY SELECTOR for a different sequence. If it becomes apparent that any sequence in which the same track is repeated in play is desired frequently this can be provided for in accordance with the principles of the system by providing a head selector disk 192 and an erasing head selector disk 192' on shaft 193 wired to the various heads in the desired sequence of play. The system is thus readily adapted for automatic and semi-automatic play of any desired sequence of track play whatever.

It should be noted that, the respective operating selective switch arms 154, 154' and respectively associated trio of contacts 158, 158' of the PLAY SELEC- TOR control, and the respective operating selective switch arms 601-604, 701-704 of the STEREO SELECTOR control, and also the respective operating selective switch arms 190, 190' of the SEQUENCE SELECTOR control, when they are respectively energized by the PLAY/RECORD switch 131, selectively activate and deactivate the respective operating heads via switch 80, thus there are provided novel TRACK SELECTOR panel controls for track selection and/or stereo tracks selection on successive and/or consecutive tracks in a single recorder system.

The PLAY SELECTOR may be employed solely for a track selector recorder system; in this respect, the SEQ.-STEREO selection position and the connections to the STEREO SELECTOR control, and to the SEQUENCE SELECTOR control can be eliminated.

The STEREO SELECTOR may be employed solely for manual and/or automatic stereo-tracks selection systems; in this respect, the connections to the PLAY SELECTOR control, and to the SEQUENCE SELECTOR control can be eliminated.

The SEQUENCE SELECTOR control may be employed solely for semi-automatic and/or automatic systems of track operation of a single desired sequence of tracks; in this respect, the connections to the PLAY SELECTOR control, and to the STEREO SELECTOR control can be eliminated.

Differing various combinations of the three individual controls may be employed in numerous novel recorder systems created by the control means of this invention.

If the number of available tracks on the tape 14 exceeds four, then the sets of record-reproduce and erasing heads will be increased accordingly and the various selector switches will be provided with an increased number of switch positions, to increase the numbers of the stereo, consecutive, and repeated sequences of play possible without limit.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

[1. A track selection for a magnetic signal recording system, comprising a head assembly including multiple recording heads and multiple associated erase heads disposed on the tracks of a multiple track tape for recording and erasing signals, three individual controls, said recording heads and said erase heads being connected to the three controls, the first control being a play selector control having multiple track selection positions, the second control being a stereo selector control connected to one position of said play selector control and having multiple predetermined sequences of stereo tracks selection positions, the third control being a sequence selector control connected to the off position of said stereo selector control and having multiple predetermined sequences of tracks selection positions, said stereo selector control being activated when the play selector control is disabled, said sequence selector control being activated when the play selector control and the stereo selector control are disabled, each control including selective switch means arranged for selectively activating and deactivating the heads, and means connecting respective recording means, and respective erasing means to the respective operating selective switch means of said each control for energizing same thereby applying track selection means for selectively activating and deactivating respective operating heads disposed on the tracks of the multiple track tape for selected positions of the operating control; whereby said play selector control selectively activates one recording head and one respectively associated erase head simultaneously on one track at the selected position of said multiple track selection positions, and activates another recording head and another respectively associated erase head simultaneously on another track at another selected position while simultaneously deactivating said one recording head and said one respectively associated erase head, and whereby when the said play selector control is disabled the said stereo selector control selectively activates one pair of recording heads and one pair of respectively associated erase heads simultaneously on one pair of predetermined stereo tracks at the predetermined position of the selected sequence of said multiple predetermined sequences of stereo tracks selection positions, and activates another pair of recording heads and another pair of respectively associated erase heads, simultaneously on another pair of predetermined stereo tracks while simultaneously deactivating said one pair of recording heads and said one pair of respectively associated erase heads, then deactivates said selected sequence and activates another selected sequence of said multiple predetermined sequences of stereo tracks selection positions thereby selectively activates one pair of recording heads and one pair of respectively associated erase heads simultaneously on one pair of predetermined stereo tracks at the predetermined position of said another selected sequence, and activates another pair of recording heads and another pair of respectively associated erase heads simultaneously on another pair of predetermined stereo tracks while simultaneously deactivating said one pair of recording heads and said one pair of respectively associated erase heads, and also whereby when the said play selector control and the said stereo selector control are both disabled the said sequence selector control selectively activates one recording head and one respectively associated erase head simultaneously on one predetermined track at the predetermined position of the selected sequence of said multiple predetermined sequences of tracks selection positions, and activates another recording head and another respectively associated erase head simultaneously on another predetermined track while simultaneously deactivating said one recording head and said one respectively associated erase head, then deactivates said selected sequence and activates another selected sequence of said multiple predetermined sequences of tracks selection positions thereby selectively activates one recording head and one respectively associated erase head simultaneously on one predetermined track at the predetermined position of said another selected sequence, and activates another recording head and another respectively associated erase head simultaneously on another predetermined track while simultaneously deactivating said one recording head and said one respectively associated erase head.]

[2. A track selection means for a magnetic signal recording system according to the construction part of claim 1, wherein is provided means for selectively connecting said recording heads for use as reproducing heads for reproducing the previously recorded signals.]

[3. A track selection means for a magnetic signal recording system, comprising a head assembly including multiple recording heads and multiple associated erase heads disposed on the tracks of a multiple track tape for recording and erasing signals, three individual controls, said recording heads and said erase heads being connected to the three controls, the first control being a play selector control having multiple track selection positions, the second control being a stereo selector control connected to one position of said play selector control and having multiple stereo tracks selection positions, the third control being a sequence selector control connected to the off position of said stereo selector control and having a predetermined sequence of tracks, said stereo selector control being activated when the play selector control is disabled, said sequence selector control being activated when the play selector control and the stereo selector control are disabled, each control including selective switch means arranged for selectively activating and deactivating the heads, and means connecting respective recording means, and respective erasing means to the respective operating selective switch means of said each control for energizing same thereby applying track selection means for selectively activating and deactivating respective operating heads disposed on the tracks of the multiple track tape for selected positions of the operating control; whereby said play selector control selectively activates one recording head and one respectively associated erase head simultaneously on one track at the selected position of said multiple track selection positions, and activates another recording head and another respectively associated erase head simultaneously on another track at another selected position while simultaneously deactivating said one recording head and said one respectively associated erase head, and whereby when the said play selector control is disabled the said stereo selector control selectively activates one pair of recording heads and one pair of respectively associated erase heads simultaneously on one pair of stereo tracks at the selected position of said multiple stereo tracks selection positions, and activates another pair of recording heads and another pair of respectively associated erase heads simultaneously on another pair of stereo tracks at another selected position while simultaneously deactivating said one pair of recording heads and said one pair of respectively associated erase heads, and also whereby when the said play selector control and the said stereo selector control are both disabled the said sequence selector control selectively activates one recording head and one respectively associated erase head simultaneously on one predetermined track at said predetermined sequence of tracks, and activates another recording head and another respectively associated erase head simultaneously on another predetermined track while simultaneously deactivating said one recording head and said one respectively associated erase head.]

[4. A track selection means for a magnetic signal recording system according to the construction part of claim 3, wherein is provided means for selectively connecting said recording heads for use as reproducing heads for reproducing the previously recorded signals.]

[5. A track selection means for a magnetic signal recording system, comprising a head assembly including multiple recording heads and multiple associated erase heads disposed on the tracks of a multiple track tape for recording and erasing signals, two individual controls, said recording heads and said erase heads being connected to the two controls, the first control being a play selector control having multiple track selection positions, the second control being a stereo selector control connected to one position of said play selector control and having multiple stereo tracks selection positions, said stereo selector control being activated when the play selector control is disabled, each control including selective switch means arranged for selectively activating and deactivating the heads, and means connecting respective recording means, and respective erasing means to the respective operating selective switch means of said each control for energizing same thereby applying track selection means for selectively activating and deactivating respective operating heads disposed on the tracks of the multiple track tape for selected positions of the operating control; whereby said play selector control selectively activates one recording head and one respectively associated erase head simultaneously on one track at the selected position of said multiple track selection positions, and activates another recording head and another respectively associated erase head simultaneously on another track at another selected position while simultaneously deactivating said one recording head and said one respectively associated erase head, and whereby when said play selector control is disabled the said stereo selector control selectively activates one pair of recording heads and one pair of respectively associated erase heads simultaneously on one pair of stereo tracks at the selected position of said multiple stereo tracks selection positions, and activates another pair of recording heads and another pair of respectively associated erase heads simultaneously on another pair of stereo tracks at another selected position while simultaneously deactivating said one pair of recording heads and said one pair of respectively associated erase heads.]

[6. A track selection means for a magnetic signal recording system according to the construction part of claim 5, wherein is provided means for selectively connecting said recording heads for use as reproducing heads for reproducing the previously recorded signals.]

[7. A track selection means for a magnetic signal recording system, comprising a head assembly including multiple recording heads and multiple associated erase heads disposed on the tracks of a multiple track tape for recording and erasing signals, two individual controls, said recording heads and said erase heads being connected to the two controls, the first control being a play selector control having multiple track selection positions, the second control being a sequence selector control connected to one position of said play selector control and having a variable predetermined sequence of tracks, said sequence selector control being activated when the play selector control is disabled, each control including selective switch means arranged for selectively activating and deactivating the heads, and means connecting respective recording means, and respective erasing means to the respective operating selective switch means of said each control for energizing same thereby applying track selection means for selectively activating and deactivating respective operating heads disposed on the tracks of the multiple track tape for selected positions of the operating control; whereby said play selector control selectively activates one recording head and one respectively associated erase head simultaneously on one track at the selected position of said multiple track selection positions, and activates another recording head and another respectively associated erase head simultaneously on another track at another selected position while simultaneously deactivating said one recording head and said one respectively associated erase head, and whereby when said play selector control is disabled the said sequence selector control selectively activates one recording head and one respectively associated erase head simultaneously on one predetermined track at said predetermined sequence of tracks, and activates another recording head and another respectively associated erase head simultaneously on another predetermined track while simultaneously deactivating said one recording head and said one respectively associated erase head.]

[8. A track selection means for a magnetic signal recording system according to the construction part of claim 7, wherein is provided means for selectively connecting said recording heads for use as reproducing heads for reproducing the previously recorded signals.]

9. A track selection means for a magnetic signal recording system, comprising a head assembly including multiple recording heads and multiple associated erase heads disposed on the tracks of a multiple track tape for recording and erasing signals, a play selector control, said recording heads and said erase heads being connected to said play selector control, said play selector control having multiple track selection positions and having a stereo tracks position, said stereo tracks position being disabled when any track selection position is selected, said play selector control including selective switch means arranged for selectively activating and deactivating the heads, and means connecting respective recording means, and respective erasing means to the respective operating selective switch means of said play selector control for energizing same thereby applying track selection means for selectively activating and deactivating respective operating heads disposed on the tracks of the multiple track tape for selected positions of the control; whereby said play selector control selectively activates one recording head and one respectively associated erase head simultaneously on one track at the selected position of said multiple track selection positions thereby disabling said stereo tracks position, and activates another recording head and another respectively associated erase head simultaneously on another track at another selected position while simultaneously deactivating said one recording head and said one respectively associated erase head.

10. A track selection means for a magnetic signal recording system according to the construction part of claim 9, wherein is provided means for selectively connecting said recording heads for use as reproducing heads for reproducing the previously recorded signals.

* * * * *